United States Patent [19]

Vardaman et al.

[11] Patent Number: 4,913,380
[45] Date of Patent: Apr. 3, 1990

[54] FUEL SYSTEM FOR CANARD AIRCRAFT

[75] Inventors: Billy G. Vardaman, Albany, Ga.; Corwin W. Meyer, Ocala, Fla.

[73] Assignee: Omac, Inc., Albany, Ga.

[21] Appl. No.: 256,952

[22] Filed: Oct. 13, 1988

[51] Int. Cl.⁴ .................. B64C 3/34; B64D 37/04; B64D 37/28
[52] U.S. Cl. ................ 244/135 R; 137/263; 137/571; 60/734
[58] Field of Search .......... 244/135 R, 135 C, 13, 244/45 R, 45 A, 91; 137/263, 571; 60/734, 39.094

[56] References Cited

U.S. PATENT DOCUMENTS

| | | | |
|---|---|---|---|
| 2,953,156 | 9/1960 | Bryant | 137/263 |
| 3,259,066 | 7/1966 | Williams et al. | 137/571 |
| 3,279,522 | 10/1966 | Norris et al. | 244/135 R |
| 3,419,233 | 12/1968 | Wotton | 244/135 R |
| 3,782,400 | 1/1974 | Hardison et al. | 244/135 C |
| 4,739,957 | 4/1988 | Vess et al. | 244/91 |

FOREIGN PATENT DOCUMENTS 969310 12/1950 France ............... 244/135 R

Primary Examiner—Galen L. Barefoot
Attorney, Agent, or Firm—Sughrue, Mion, Zinn, Macpeak & Seas

[57] ABSTRACT

A high wing Canard aircraft mounts three strake fuel tanks within the top of the aircraft fuselage on the right and left sides thereof in a fore and aft array interconnected by horizontal interconnect lines at the bottoms of the strake tanks to provide an alternate fuel path in the event of tank-line contamination blockage and forming a secondary gravity feed system. A pair of wing tanks integrated to the high wing of the Canard aircraft, to the rear of the strake tanks, feed along with individual horizontal fuel lines from the strake tanks to a central fuel collector tank interposed between the main high wing sections with low pressure drop flapper check valves at the ends of the individual horizontal lines internally of the collector tank for preventing fuel from leaving the collector tank. The primary gravity feed system defined thereby isolates each tank from the other, thereby preventing large fuel excursions during extreme flight maneuvers. A sump tank integrated to and underlying the common collector tank supplies fuel through the main fuel supply line to the engine via primary and secondary boost pumps. The excess fuel returning from the engine at boost pump pressure functions as the motive fluid for jet pumps, one in the front of each forward strake tank and one in the outboard portion of each wing tank for supplying fuel to the collector tank at a rate one half of the engine take-off fuel demand. Overflow return lines are routed from the top of the collector tank back to each tank containing a jet pump. These lines also terminate with low pressure drop flapper check valves to prevent cross flow between tanks. Filler manifolds overlying one of the strake tanks to each side of the aircraft meter fuel to the tanks along one side, at a rate proportional to the tank size.

7 Claims, 4 Drawing Sheets

FUEL SYSTEM FOR CANARD AIRCRAFT

FIELD OF THE INVENTION

This invention relates to the fuel system for a Canard-type aircraft, and more particularly to a fuel system fed from multiple storage tanks and into a single collector tank which is self-levelling to minimize center of gravity shifts during flight.

BACKGROUND OF THE INVENTION

Figure 1:
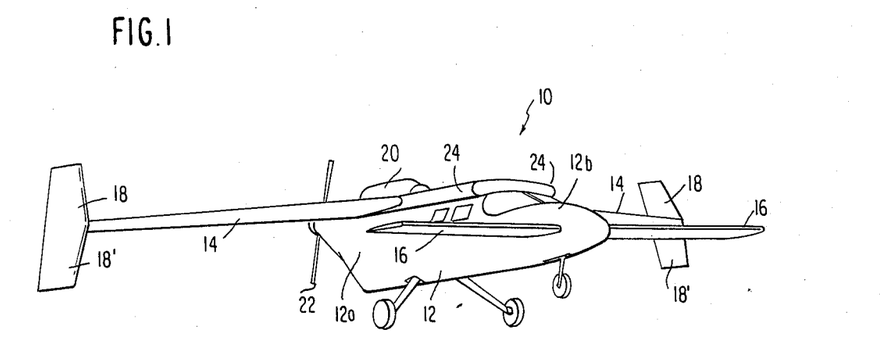
FIG. 1 is a perspective view of a high wing, pusher-type canard aircraft incorporating a fuel system forming a preferred embodiment of the present invention.

Reference to FIG. 1 shows a single jet prop engine powered high wing, Canard-type aircraft to which the invention has particular application. The aircraft indicated generally at 10, is driven by a prop jet engine supported by the fuselage 12 at the rear end 12a thereof. The aircraft is of the high wing type. Specifically a high main wing 14 is mounted to the fuselage 12 and spans across the top of the same. The aircraft 10 is not equipped with a conventional horizontal stabilizer. Instead a pair of canards 16 which, like the main wing 14 comprise lifting surfaces of air flow configuration add to the lift imparted by the main wing 14 and extend horizontally outwardly from the aircraft fuselage near the nose thereof and to respective sides. The aircraft lacks a conventional vertical tail. However, the main wing 14 is provided at opposite ends, with upwardly and downwardly inclined winglets 18, 18' integrated to the tips of the main wing 14. The jet prop engine drives a propeller 22 to push the aircraft with portion 12a of the fuselage acting as the engine housing for the engine.

Such high wing, canard aircraft lacking the downthrust producing conventional horizontal stabilizer, are highly fuel efficient and designed for long distance flight. As a result, they are capable of carrying large quantities of fuel which must be distributed throughout the aircraft. However, fuel stored in multiple tanks has historically been a problem from time to time, as pilots forget to switch tanks or a valve fails to respond to control commands. As a consequence, a number of incidents and accidents have occurred. As may be appreciated, the fore and aft weight and balance and, therefore, attitude of the aircraft is critical to the flight capability of the aircraft, particularly with respect to the canards 16. This safety issue is addressed effectively by this invention.

To provide a fuel system for long distance flights, such aircraft requires a number of fuel tanks to be mounted both along the fuselage and the main wings. As a result, fuel is distributed over a wide distance fore and aft. With the fuel distributed over a wide distance fore and aft, with the fuel distributed over such a wide distance, any tendency of the fuel to concentrate at one position or the other within the aircraft fuel system can be equally disturbing to flight control and under severe conditions render the aircraft incapable of flight.

It is therefore a primary object of the present invention to provide an improved fuel system for a canard aircraft in which a number of fuel tanks are mounted in fore and aft alignment along the fuselage and in both inboard high main wings and are integrated in a fuel distribution system to a tank within the center high main wing section, which utilizes a single collector tank feeding to the engine, in which the tanks are self-levelling, to minimize center of gravity shifts during flight and in which virtually all the fuel is transferred to the collector tank during the course of flight.

It is a further object of the invention to provide a fuel system utilizing gravity effect for transferring fuel from individual tanks to a common collector tank which utilizes simple flapper check valves for preventing fuel, once reaching the collector tank, from leaving that tank and for isolating each tank from the others to prevent large fuel excursions during extreme flight maneuvers.

DESCRIPTION OF THE PREFERRED EMBODIMENT

Figure 3:
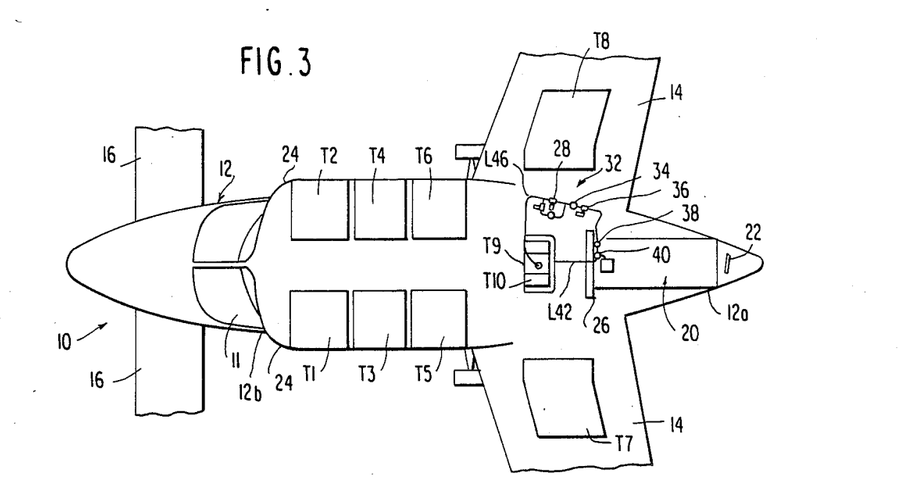
FIG. 3 is a top plan view of the aircraft of FIG. 1, showing the basic components of the fuel system of the present invention.
Figures 4, 5:
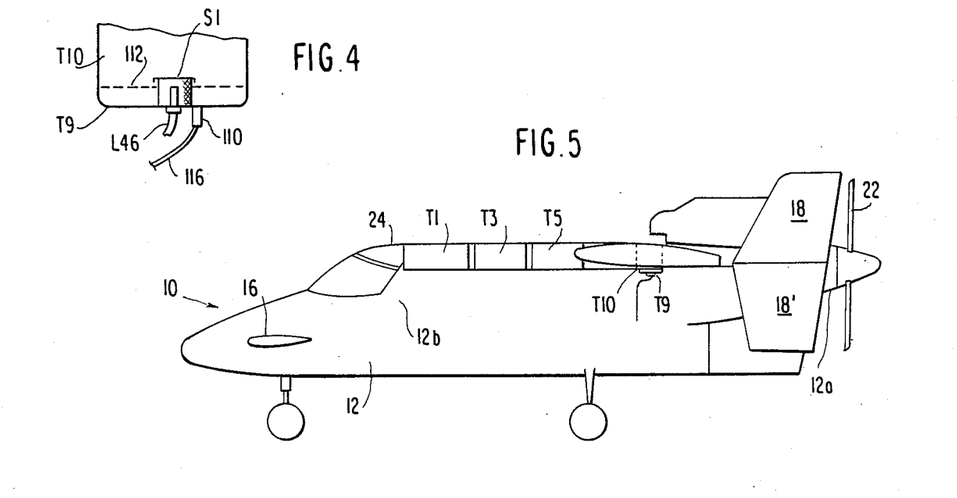
FIG. 4 is an enlarged vertical sectional view of the common collector tank and the fuel sump.
FIG. 5 is a side elevational view of the aircraft of FIG. 3 showing the location of common collector tank forming a principal element of the fuel system of the present invention.

By reference to FIGS. 3 and 5, the location of the nine separate fuel tanks of the fuel system of this invention may be ascertained. There is a relatively large span in a fore and aft direction of those tanks for storage of a large amount of fuel, requiring control means for maintenance of the center of gravity of the aircraft for proper flight characteristics of the canard aircraft. In that respect, the fuselage 12 is provided with an upper fuselage section 12b partially forming the cabin of the aircraft, and taking the form of a pair of bulbous lateral projections 24 to each side of the aircraft and merging into the leading edge portion of the main wing 14 at the rear thereof. The design permits the incorporation therefore of six strake fuel tanks or fuel cells, three to each side of the fuselage, and having a total fuel capacity for instance of 190 gallons. The strake cells or tanks on the left side of the aircraft are identified at T-1, T-3 and T-5 (using odd numbers for elements on the left side of the aircraft, and even numbered elements for the right side of the aircraft) for the fuel system as further described herein. On the right side of the aircraft there are three strake cells or tanks, at T-2, T-4 and T-6 from the front to the rear of the aircraft, all commonly sized and positioned in longitudinal alignment with a slight spacing therebetween. The aircraft 10 is provided with two wing tanks, one on each side, which may contain a further 100 gallons of fuel in the exemplary aircraft 10. The left wing tank is designated T-7, that to the right T-8. A common collector tank T-10 is mounted on the longitudinal center line of the aircraft in general lateral alignment with the wing tanks T-7, T-8, and is of a 10-gallon capacity, for example. The common collector tank T-10 is integrated to a 0.75 gallon sump tank T-9. As a result, the fuel capacity is approximately 300 gallons for the aircraft shown. For structural purposes, the fuel capacity is restricted to approximately 245 gallons. In such system the unusable fuel quantity is estimated to be approximately 3 gallons, including that of the 0.75 gallon sump, yielding a usable quantity of 242 gallons. The fuel tanks are formed of the strake cells or tanks separately formed and mounted to the fuselage, while all wing fuel tanks are integral and are primed with a biological inhibitor. For all tanks, conventional polymer base sealers are used for leak prevention.

Figure 2A:
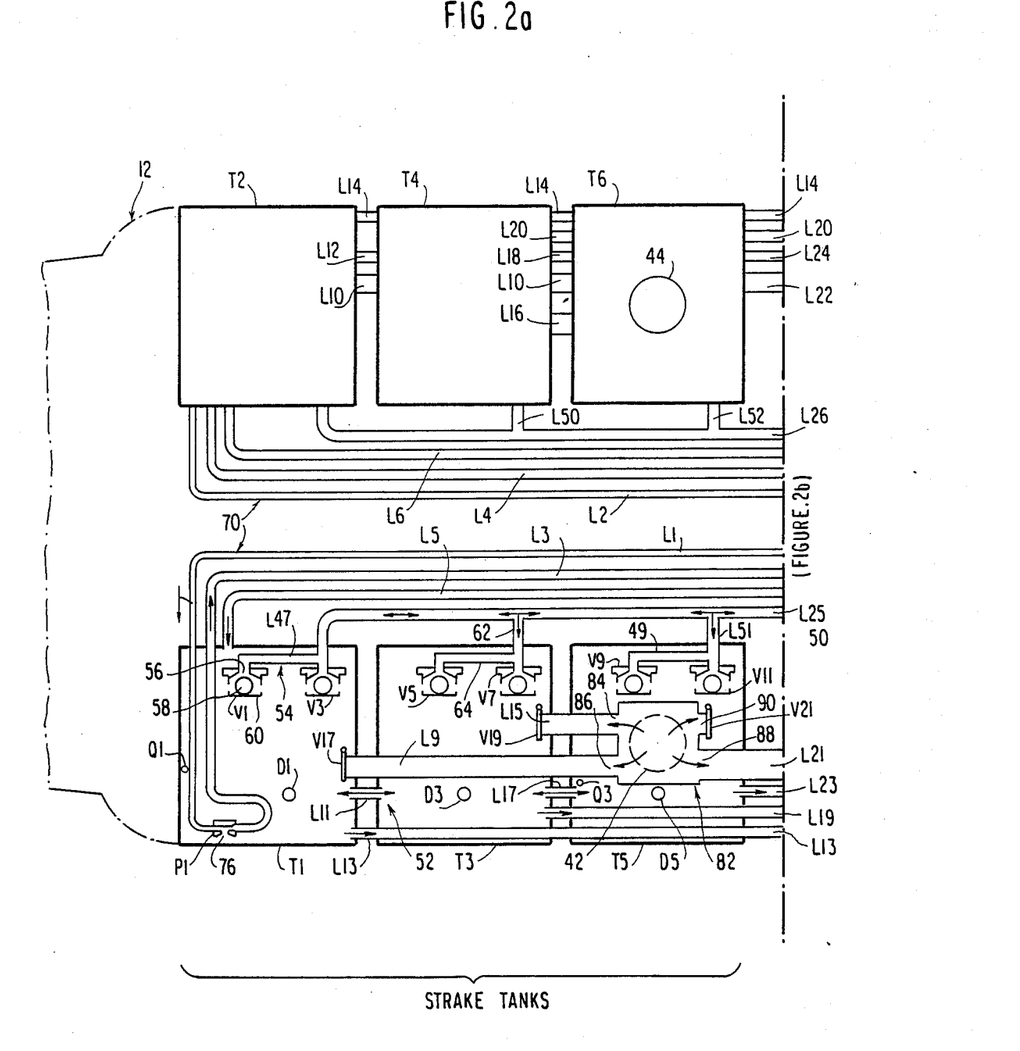
FIGS. 2a, 2b and 2c are sections of a schematic, hydraulic diagram of the improved full fuel system forming the preferred embodiment of the present invention.
Figure 2B:
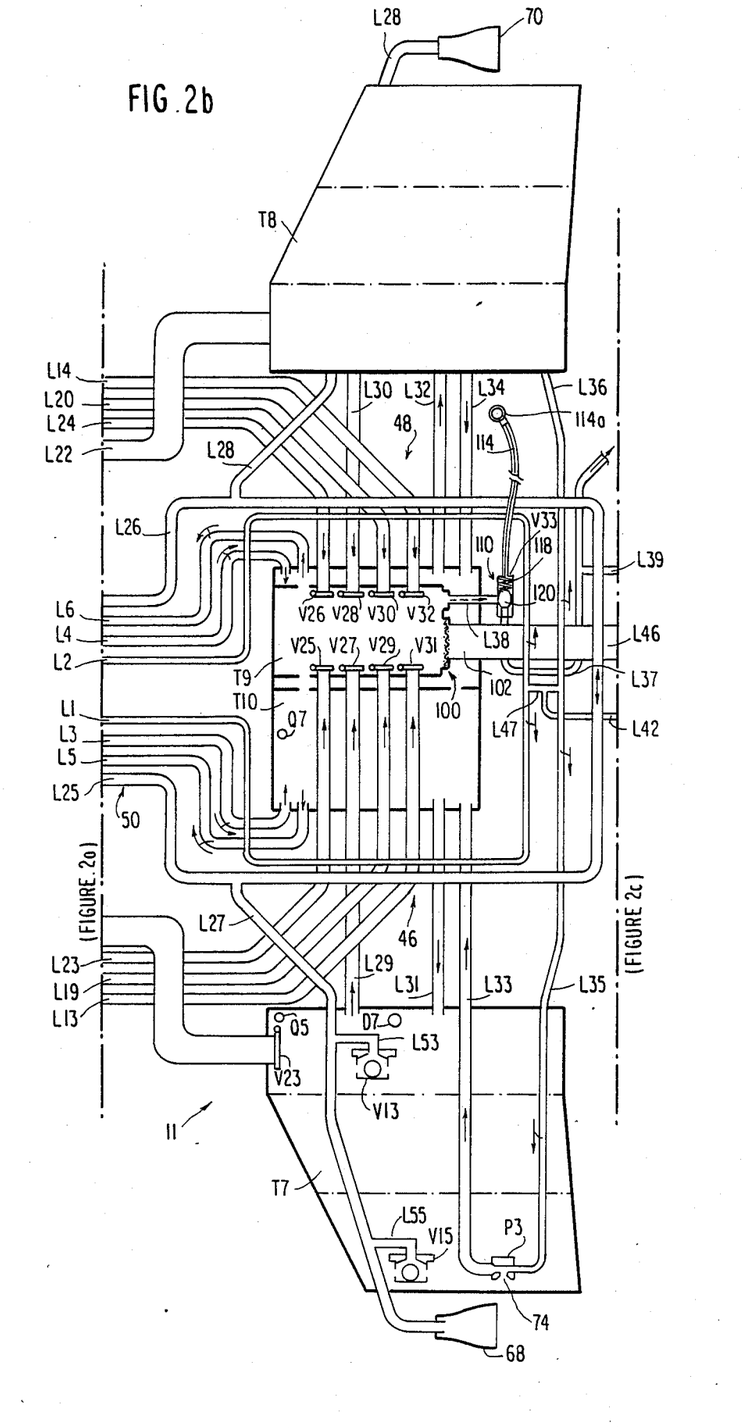
Figure 2C:
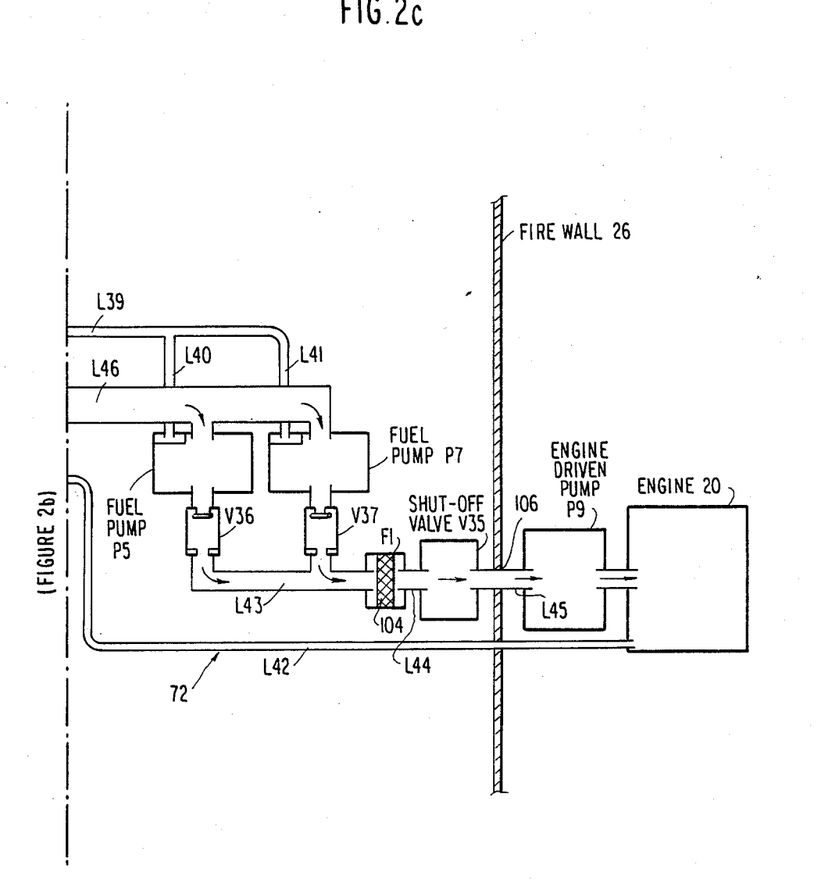

Reference may be had to FIG. 2, both for the identification and location of the main components of the fuel system 11 and the hydraulic lines interconnecting the same. Further reference to FIGS. 3 and 4 shows the location of the additional main components of the fuel system 11 for the canard aircraft 10. Engine 20 is located aft of the common collector tank 10 and its integral sump tank T-10 and T-9, behind a fire wall indicated schematically at 26. The other main components of the fuel system 11 are located in the vicinity of the common collector tank T-10 and engine 20. As shown in FIG. 3, the system is provided with a main fuel pump 28, a secondary or emergency fuel pump 30, (both electrically operated), and within the main fuel line L-46 leading from the sump tank T-9 to the engine 20. These are components of a pressure supply system indicated generally at 32 which begins at the sump tank T-9 outlet. While the pressure supply system 32 will be described in detail hereinafter, it should not noted in FIG. 3 that the pressure supply system 32 further includes a main fuel filter 34, a fuel shut-off valve 36, a fuel low pressure switch 38, all in order and upstream of an engine-driven fuel pump 40. A fuel return line L-42 functions to return excess fuel from engine 20 back to fuel tanks T-1 through T-10, again in a manner to be described hereinafter.

Further, as may be appreciated by reference to FIGS. 3 and 5, the various fuel tanks T-1 through T-10 are located at approximately the same level at normal flight attitude under conditions in which fuel may flow via gravity from the individual tanks T-1 through T-8 to the common collector tank T-10. This is in conjunction with and forms an aspect of the self-levelling system designed into the multi-fuel tank fuel system.

Referring next to the three sections of the hydraulic schematic diagram of the fuel system 11, FIGS. 2a, 2b and 2c, the fuel tanks T-1 through T-10 are illustrated in the same position as that of FIG. 3. Additional components have been added, and all of the fuel lines are shown for both the duplicate left and right side sections of the fuel system. Since the feed to and from the fuel tanks T-1, T-2, T-3, T-4, T-5, T-6, T-7, and T-8 are identical on each side, only the components on the left side employing the odd numbers are fully shown and labelled in the schematic drawings. Thus, for the forward left side fuel tank T-1, the center left side fuel tank T-3, and the aft left side fuel tank T-5, forming an array of strake tanks on that side, each of these tanks includes a pair of check valves, as at V-1 for tank T-1, and individual fuel tank drains as at D-1 for tank T-1. Only the forward strake tanks T-1 and T-2 for the left and right side of the aircraft respectively are provided with jet pumps. Jet pump P-1 is shown in forward left side tank T-1. Further, in filling of the strake tanks, the tanks are fed through common fillers as at 42, located above the aft strake tank T-5 on the left side of the aircraft, and at 44 on the aft tank T-6 for the right side of the aircraft fuselage 12.

The fuel system uses both a primary gravity feed system and a secondary gravity feed system to insure gravity feed fuel from the individual strake tanks T-1 - T-6, and the wing tanks T-7, T-8 to the common collector tank T-10. In that respect, the primary gravity feed system is comprised of left and right side sections, indicated generally at 46 and 48 respectively, and consist of individual, one-half inch OD aluminum lines leading to the central, common fuel collector tank T-10 from each strake and wing tank. Lines L-13, L-19 and L-23 lead from the left side strake tanks T-1, T-3 and T-5 respectively to the collector tank T-10 and terminate at the integral sump tank T-9. Each line is terminated at the collector tank T-10 with a low pressure dropper flap check valve as seen at V-25, V-29 and V-31 for lines L-23, L-19 and L-13 respectively. The low pressure drop per flap check valves are lightly biased to open positions.

On the right side of the aircraft fuselage 12, the strake tanks 2-T, T-4 and T-6 are connected via similar individual one-half inch OD aluminum lines L-14, L-20 and L-24 respectively to the collector tank T-10, and those lines terminate in low pressure drop flapper check valve V-32, V-30 and V-26 opening into sump tank T-9. Additionally, the left side wing tank T-7 has a line L-29 opening to the interior of that tank, and leading to the collector tank T-10 and being closed off by an identical low pressure drop flapper check valve V-27. Likewise, on the right side of the aircraft, the wing tank T-8 connected is by line L-30 to the collector tank T-10 and is provided with an appropriate low pressure drop flapper check valve V-28. Thus, the gravity feed system via its sections 46, 48 isolates each tank from the other thereby preventing large fuel excursions during extreme flight maneuvers. The one-half inch lines are designed to handle engine fuel demands many times over for engine 20.

Since the strake tanks are separated longitudinally from each other and extend over a significant longitudinal extent of the fuselage 12, redundancy is required for the gravity feed system with respect to the strake tanks. The secondary gravity feed system is indicated generally at 52, which is designed as a back-up system for the primary gravity feed system discussed above, it consists of the use of simple one-half inch OD aluminum interconnect lines L-11 and L-17 for the left side strake tanks T-1, T-3 and T-5, and corresponding mirror image one-half inch OD aluminum interconnect lines L-12 and L-18 for the right side strake tanks T-2, T-4 and T-6. Line L-11 projects longitudinally between tanks T-1 and T-3 with ends opening to respective tanks near the bottom of the tanks and permitting free flow between those two tanks. Line L-17 is in line with interconnect line L-11 but connects the center strake tank T-3 to the aft strake tank T-5 on the left side of the aircraft. The double-headed arrows show flow in either direction to provide alternate fuel path in the event of tank line contaminate blockage for any one of the strake tanks. The same arrangement as shown for tanks T-1, T-3 and T-5 occurs for right side tanks T-2, T-4 and -6 via interconnect lines L-12 and L-18. These lines are also sized to supply the maximum engine fuel demands with some margin of safety.

The secondary gravity feed system also provides redundant connections between the wing tanks T-7, T-8 and the collector tank T-10. In that respect, one-half inch OD aluminum interconnect lines L-31 and L-32 project through the sides of wing tanks 7 and 8 respectively and through opposite sides of the collector tank T-10 and open unrestrictedly between respective tanks. This insures, upon any over accumulation of fuel within collector tank T-10, flow as shown by the arrows from the collector tank back to the respective wing tanks T-7, T-8 via lines L-31, L-32. Each strake fuel cell or fuel tank is interconnected to the adjacent cell or tank via flexible hoses which are clamped to beaded fittings attached to the tank vertical walls. The beaded fittings are inserted approximately 1.5 inches into the flexible hose before clamping with tangential worm clamps. This arrangement allows over two inches of tank separation and considerable misalignment during a severe crash without fuel spillage. The secondary gravity feed system lines L-11, L-12, and L-17, L-18 between forward and center, and center and aft strake tanks respectively for both left and right sides of the aircraft employs such flexible hose connections. The arrangements are schematically shown in FIGS. 2a, 2b, and 2c and in FIG. 2a as a straight line or tube connection, but are preferably formed in the manner described above, using the beaded tubular fittings integral with the tank vertical walls in axial alignment and projecting towards each other, to which opposite ends of a flexible hose are connected.

A fuel vent system 50 is formed of an interconnected manifold in the top of each fuel tank or fuel cell having openings protected by ball float check valves. Specifically, for strake tanks T-1, T-3 and T-5, line L-25 terminates at an end remote from the collector tank 10, in a pair of branch lines L-47 with both branch line L-47 and the terminal end of line L-25 connected to ball float check valves V-1, V-3 respectively which are positioned at opposite forward and aft ends, respectively, of the forward strake tank T-1. These components form manifold 54, including the pair of check valves V-1, V-3. The check valves V-1, V-3 close when the fuel level within the forward tank T-1 rises to the opening level as, for instance, 56 for check valve V-1, in which case the ball float 58 closes. It should be kept in mind that in the schematic drawing FIGS. 2a, 2b, 2c, some of the components are illustrated, for simplicity purposes, in a horizontal orientation when, in actuality they are vertical, such as the check valves V-1, V-3. The ball float 58 rests on a perforated cage 60 of check valve V-1, and when the fuel level rises the ball float 58 floats upwardly, closing off the opening 56 which functions as a valve seat. Ordinarily, however, the top of the fuel tank T-1 is open to line 25.

In a similar respect, for the center strake tank T-3, a branch duct 62 extends from line L-25 at right angles and through the side wall of the center tank T-3 to form a portion of a second manifold 64 which is integrated to another pair of ball float check valves V-5, V-7. Valves V-5, V-7 function in the manner of check valves V-1, V-3 in the forward strake tank T-1.

The aft strake tank T-5 on the left side of the aircraft is provided with a manifold 49 through a branch line L-51. Manifold 49 includes two check valves V-9, V-11, again identical to the ball float check valves within the T-1 and T-3 strake tanks opening in the vapor space of each fuel tank or fuel cell and provideing a venting path to either of flux diverging NACA fuel vent openings located on the lower main delta wing surfaces. In that respect, branch line L-27 extends from line L-25 to the left wing vent outlet 68. From vent outlet line L-27 there extends a pair of branch lines L-53, L-55 internally of the wing tank T-7 at the top of the tank, terminating in ball float check valves V-13 and V-15 at the inboard and outboard sides of wing tank T-7. Again, the ball float check valves of the wing tanks are identical to those of the strake tanks and function in a like manner.

As may be appreciated, line L-25 of the fuel vent system extends through the center line of the aircraft and is integral with a right side fuel vent line L-26 which terminates at right side forward strake tank T-2. Branch lines L-50 and L-52 extend from vent line L-26, and open into the center strake tank T-4 and the aft strake tank T-5 on the right side of the aircraft. While not shown, the interior of those tanks as mentioned previously, is a mirror image of that shown for the left side strake tanks T-1, T-3, and T-5. Further, vent outlet line L-28 branches from line L-26, extends through the right side wing tank T-8, and opens to a right vent outlet 70 on the bottom of the right side main wing section. At the fuel vent openings located on the lower wing surface of the aircraft 10, there is a flame arrestor assembly provided at each such location to prevent vapor ignition from swept lightening strokes.

The improved fuel system of the present invention is further characterized by the use of a fuel transfer system 70.

System 70 consists of four jet pumps; jet pump P-1 located in the forward strake tank T-1 on the left side of the fuselage 12, an identically positioned jet pump (not shown) within the forward strake tank T-2 on the right side of the aircraft, a third jet pump P-3 in the outboard portion of the left side wing tank T-7, and a similar jet pump (not shown) located at an identical position within the right side wing tank T-8. The four jet pumps derive their motive flow from the engine-driven fuel injection pump P-9, specifically from the excess fuel returned from the engine 20 via excess fuel return line L-42. As seen in FIGS. 2a, 2b and 2c, fuel return line L-42 divides via line 47 into two flows, the first of which separates at the connection between line L-47 and the inboard ends of lines L-35, L-36 where the return fuel passes and functions as the motive fluid for the wing tank jet pumps including pump P-3 within wing tank T-7. The jet pump P-3 has an opening 74 within the side thereof, such that fuel within wing tank T-7 is aspirated into the return fuel flow passing through the jet pump P-3 with an increased flow rate of fuel being forced through discharge line L-33 from the jet pump P-3 to the collector tank T-10.

Similarly, for wing tank T-8, line L-36 provides the motive fluid, i.e., the return excess fuel for aspirating additional fuel from wing tank T-8 and delivering such fuel to the collector tank T-10 via jet pump discharge line L-34 which opens into the collector tank T-10 to the opposite side from line L-33 of the jet pump P-3.

Further, the return fuel which splits within line L-47 again splits into fuel return branch lines L-1, L-2, which extend to the forward strake tanks T-1 and T-2 respectively, to the left and rights sides of the aircraft fuselage 12. As shown in the drawings, for the jet pump P-1, the return fuel as indicated by the arrow aspirates fuel within the forward strake tank T-1 through side opening 76, thus causing an increased flow of fuel from the interior of the forward strake tank T-1 to exit through jet pump discharge line L-3 into the interior of the common collector tank T-10 as indicated by the arrows within that line.

The same action occurs for the forward strake tank T-2 on the right side of the aircraft fuselage, with excess return fuel in line L-2, acting as a motive fluid for a jet pump (not shown) identical to jet pump P-1 within the forward strake tank T-2 and with a jet pump discharge line L-4 supplying aspirated fuel from the forward strake tank T-2 to the collector tank T-10.

Each jet pump supplies fuel to the common collector tank T-10 at the rate of one-half the engine take-off fuel demand. The common collector tank T-10 therefore is supplied by the system alone with twice the maximum engine demand. Since this would ultimately result in over-pressurization of the collector tank T-10 if not relieved, overflow return lines are routed from the top of the collector tank back to each tank containing a jet pump. In that respect, overflow return lines L-31 and L-32 return excess fuel from the collector tank T-10 to respective wing tanks T-7, T-8 by having opposite ends opening to the collector tank T-10 and the respective wing tanks T-7, T-8. Further, the overflow return lines L-5 and L-6 open at one end to the interior of the collector tank, at the top thereof, and at their opposite ends to the forward strake tanks T-1, T-2 respectively. These lines are preferably terminated with low pressure drop flapper check valves (not shown) to prevent crossflow between tanks. The flapper valves, of course, are provided within the forward strake tanks and the wing tanks at the ends of the overflow return lines remote from the common collector tank T-10.

The fuel filler system of aircraft 10 indicated generally at 80 includes, for each side of the aircraft, a unique filler manifold indicated generally at 82, which meters fuel to each cell or tank T-1 through T-10, at a rate proportionate to its size so that each will be approximately at the same level when fueling is complete. The gravity interconnect lines between each strake tank, i.e., lines 11, 12, 17, 18 will balance the fuel levels in the six strake tanks while the wing tank levels are controlled solely by gravity between the filler openings 42, 44 and the respective wing tanks T-7, T-8. Manifold 82 is provided with five openings: an upper filler opening 42, and four side openings at 84, 86, 88 and 90. Opening 90 is closed off by a low pressure drop flapper check valve V-21. Opening 88 permits one end of line L-21 to connect to the manifold 82, while its opposite end opens directly into the wing tank T-7 through a side wall of the wing tank and which opposite end is closed off by a further low pressure drop flapper check valve V-23. Opening 84 leads to line L-15, which in turn opens to the interior of the center strake tank T-3, and the open end of the line 15 is closed off by low pressure drop flapper check valve V-19.

A line L-9 extends through the center strake tank T-3 and has an end remote from the manifold, terminating interiorally of the forward strake tank T-1 with that end being closed off by low pressure drop flapper check valve V-17. The opposite end of the line L-9 connects to the manifold 82 at opening 84. Therefore, as indicated by the four heavy arrows in FIG. 2a, the fuel with the fuel cap opening 42 at the top of the fuselage 12 upon entering the manifold 82 distributes along four separate paths into the four fuel tanks on the left side of the aircraft. The same is true for a mirror image manifold incorporated into the top of strake tank T-6 on the right side of the aircraft via filler cap 44 and with the fuel being distributed from that manifold via lines L-10 to the forward strake tank T-2, via line L-16 to the center strake tank T-3, via an internal opening identical to that at 90 for manifold 82 within the aft strake tank T-6, and via line L-22 to the right side wing tank T-8.

Preferably the filler manifolds such as 82 include an antisiphoning filler cap assembly. As may be appreciated, the left and right fuel tank system sections are not connected, and hence the tanks on the right and left side of the aircraft must be filled separately via their separate manifolds, as at 82.

As may be seen best in FIGS. 2b, 2c, the pressure supply system 32 for the fuel system 11 in detail beyond that described with reference to FIGS. 3 and 5 involves routing fuel from the common collector tank 10 specifically via a main fuel supply line L-46 which opens to the interior of the sump tank T-9 after passing through a vertical side wall of the collector tank 10 at the fuel tank outlet. The outlet indicated generally at 100 uses a flared ⅜" OD, 0.035 wall, aluminum tube 102 forming a portion of line L-46 and which protrudes into the base of the collector tank to a height which establishes the 0.75 gallon sump capacity for sump tank T-9. A 2" diameter, ¼" mesh cylindrical fuel tank outlet strainer S-1 protects the pressure supply system from large contaminants.

The fuel supply line L-46 is routed to identical parallel fuel pumps P-5, P-7. These may be welded in model 144b electric in-line fuel pumps, and constitute respectively the main and emergency boost pumps for the pressure supply system. The main pump P-5 is automatically powered at engine start from the main bus, while the secondary or emergency pump P-7 is powered by the battery bus and is immediately available to the crew with an instrument panel switch at the aircraft cockpit 11, FIG. 3. The outlet of each pump P-5, P-7 contains a check valve to prevent backflow. The check valve V-36 connects to a pump discharge line L-43 which also receives the outlet flow from the secondary boost pump P-7 via its check valve V-37. Downstream of the main and emergency fuel pump outlet T, formed by Line L-43, is a 20 1 micron fuel filter F-1. A short length line L-44 connects the filter F-1 to the fuel pressure supply system shut-off valve V-35. Preferably, the 20 micron fuel filter F-1 is equipped with a visual bypass indicator which is observed through an inspection door during the pre-flight walk-around. The bypass indicator trips when filter contamination produces approximately 1.8 psi pressure drop across the replaceable filter element 104 within the pressure supply system. Just downstream thereof is the fuel shut-off valve V-35, with valve starter position being enunciated by "in transit" logic, and an amber "fuel SOV in transit" light is provided in the glare shield enunciator panel at cockpit 11. A guarded 2-position instrument panel switch (at cockpit 11) controls the normally open V-35 shut-off valve. The valve 35 is energized to close. A flexible fire-resistant fuel supply hose L-45 is routed from the fire wall bulkhead 26 fitting from a fire wall bulkhead fitting indicated schematically at 106, and mounted to the fire wall 26 to the engine 20-mounted low pressure switch. A 10 psig (decrease in pressure) pressure setting for this switch easily meets the PT6A-135A9 PSIG above TVP requirement for the engine driven pump P-9 coupled to the fuel supply hose, when motor flow is being used. A red "fuel low pressure" light is provided in the enunciator panel at the pilot cockpit 11.

Preferably, a turbine flow flow meter is provided in the high pressure line between the engine-driven pump and the fuel control unit (FCU). This arrangement improves syastem reliability in the event of a so-called "lock rotor failure of the flow meter".

The fuel system also has a fuel drain system which consists of a drain valve assembly indicated generally at 110, FIG. 2b, which is installed in the base of the collector tank sump pump T-9, via line L-38. In the schematic representation of FIG. 2b, the sump is illustrated as a separate portion of the tank. As evidenced in FIG. 4, the fuel tank sump is simply a dropped portion of the common collector tank T-10. An upper open end of the main fuel supply line L-46 opens to the level 112 of the top of the sump tank and is surrounded by the fuel tank outlet strainer S-1, FIG. 4. A drain valve assembly 110 includes a spring-loaded remote actuating pull control wire 114, and an overboard drain line L-37. A ring 114a is provided at the end of the pull control 114. The drain pull control ring or knob 114a is accessed through the fuel filter inspection door during pre-flight walk-around. A coil spring 118 internally of the assembly 110 maintains a plunger or movable valve element 120 seated on the end of the overboard drain line L-37 and closes off communication between the drain line L-37 and line L-38 opening to the interior of the sump T-9. The fuel drain line L-37 terminates at the lower right side of fuselage 12 so that it can be observed during valve actuation. Both electric fuel pump seal drains L-40, L-41 are connected to the overboard drain line L-37 via a common connector line L-39. Thus, if seal failure occurs for the electric fuel pump seals, the area about the pump seals drains to the exterior of the fuselage through the common fuel drain line L-37.

It should be noted that the fuel quantity indication requirements are effected by use of a conventional capacitance gauging system consisting of a single probe in each forward and aft strake tank, and one in each wing tank. For the left side of the aircraft, the capacitance gauges are indicated at Q-1 in the forward strake tank T-1; Q-3 in the aft strake tank T-5, and Q-5 in the delta wing tank T-7. Similar capacitance gauging probes (not shown) are provided for strake tanks T-2 and T-6 as well as right side wing tank T-8. Preferably a total fuel quantity is read out in a single display at cockpit 11. Additionally, individual left and right fuel tank system section quantities are also displayed. This arrangement assures that excessive fuel imbalance does not exist after a fueling operation. An enunciator panel amber low fuel quantity warning light (not shown) is activated by a float switch installed in the collector tank responsive to a capacitance gauge probe Q-7 within that common collector tank 10. Actuation is set for approximately 10 gallons of fuel remaining to permit the pilot to take appropriate action.

While the invention has been particularly shown and described with reference to a preferred embodiment thereof, it will be understood by those skilled in the art that various changes in form and detail may be made without departing from the spirit and scope of the invention.

What is claimed is:

1. A gravity feed fuel system for a high wing Canard aircraft including:
   an elongated fuselage,
   a high, main wing mounted to the top of said fuselage and having right and left wing sections projecting outwardly thereof to opposite sides of said fuselage,
   said fuel system comprising:
   a plurality of fore and aft, spaced strake fuel tanks mounted within the top of said fuselage forward of said main wing at a common level,
   a wing tank within each main wing section at said common level, a common, central collector tank mounted between said wing tanks, in alignment with said fuselage tanks and at said common level,
   a fuel sump tank below said collector tank, means communicating said sump tank with the bottom of said collector tank to receive fuel directly from the collector tank,
   main fuel supply line opening to the sump tank for feeding fuel to at least one aircraft engine mounted to said aircraft,
   a primary gravity feed system comprising individual horizontal fuel lines leading from the bottom of each strake and wing tank to the central common fuel collector tank, each individual fuel line terminating at said fuel collector tank in a low pressure drop, normally open flapper check valve for preventing reverse flow from the collector tank back to the strake and wing tanks,
   a secondary gravity feed system comprising horizontal interconnect fuel lines connected to and opening freely at opposite ends into the bottoms of adjacent strake tanks,
   said individual fuel lines and said interconnect fuel lines being oversized to meet maximum fuel demands of the engine with some margin of safety, and a fuel transfer system comprising:
   at least one boost pump in the main fuel supply line between said sump tank and said engine,
   at least one jet pump in the strake tank most remote from said collector tank and a jet pump in an outboard portion of each wing tank,
   a fuel return line from said engine for returning excess fuel at boost pump pressure,
   means for connecting said fuel return line to said jet pump for causing the excess fuel at boost pump pressure to act as the motive flow for the jet pumps, inlets to the jet pumps for allowing fuel within said most remote strake tank and each wing tank to enter the jet pumps for aspiration thereby,
   discharge lines from each jet pump to the collector tank, and wherein the jet pumps have a capacity such that each jet pump supplies fuel to the collector tank at a high proportion of the engine take-off fuel demand, whereby the collector is supplied with fuel by the fuel transfer system which is considerably in excess of the maximum engine demand, and wherein said fuel transfer system further comprises overflow return lines routed from the top of the common, central collector tank back to each fuel tank containing a jet pump, and wherein said overflow return lines terminate at each tank containing a jet pump in low pressure drop, normally open flapper check valve for preventing fuel cross flow between tanks.

2. The gravity feed fuel system as claimed in claim 1, further comprising a fuel filler system:
   said fuel filler system comprising at least one filler manifold for supplying fuel to each of said strake tanks and to said wing tanks, means for metering fuel to each fuel tank at a rate proportional to its size such that each tank is approximately at the same level during and upon completion of fueling, and wherein said filler manifold includes an antisiphoning filler cap assembly.

3. The gravity feed fuel system as claimed in claim 2, wherein said strake tanks comprise individual right and left side strake tank sections mounted within said fuselage to the right and left sides of the aircraft fuselage, wherein each strake tank section includes an individual filler manifold, and wherein the left and right main wing fuel tanks are interconnected respectively to the left and right strake tank sections such that left and right fuel tank section systems are formed thereby, and wherein said left and right aircraft fuel tank system sections are disconnected from each other and filled separately.

4. The gravity feed fuel system as claimed in claim 1, further comprising a fuel vent system:

said fuel vent system comprising. a vent line, a manifold within the top of each fuel tank having at least one opening therein, a ball float check valve selectively closing off each said at least one opening within each fuel vent system manifold and including a ball float gravity positioned such that the openings under normal flight conditions are open with said ball floats closing off the manifold openings upon the fuel level rising to the opening level for any reason to prevent fuel from entering the vent line, and said vent line interconnecting the manifolds and connecting the openings within respective manifolds, and wherein said vent line terminates in a fuel vent discharge opening located on a lower surface of the high main wing of the aircraft.

5. The gravity feed fuel system as claimed in claim 1, further comprising a fuel tank outlet strainer within an outlet of the main fuel supply line opening to the sump tank for removing large contaminants from the fuel flowing to the engine, wherein said at least one boost pump comprises a pair of electric, in line fuel pumps constituting respectively, main and emergency boost pumps, said main fuel supply line opening to inlets for each of said boost pumps, each of said boost pumps further comprising an outlet containing check valves to prevent back-flow through the boost pumps from the engine, said main fuel supply line including a tee downstream of the main and emergency fuel boost pump outlets, a fuel filter within said main fuel supply line downstream of the tee, and a fuel shut-off valve downstream of said outlet check valve and upstream of said engine.

6. The gravity feed fuel system as claimed in claim 1, further comprising a fuel drain system, said fuel drain system comprising a drain valve assembly installed in the bottom of the collector tank in the sump tank, said drain valve assembly including a cylindrical valve casing, an axial bore within said casing, an axially shiftable plunger in said casing, a drain inlet line opening from said sump tank to the side of said valve casing, an overboard drain line opening axially to said valve casing and being normally closed by said plunger, a coil spring mounted within said casing on the side of said plunger remote from said overboard drain line outlet connection, to bias said plunger to a position closing off communications to said drain line, a spring-loaded remote actuating pull control wire coupled to said plunger and terminating in a drain pull knob such that pulling of said control knob causes retraction of the plunger from the end of said overboard drain line opening to the interior of said valve casing to communicate the line between said sump tank and said valve casing to said overboard drain line.

7. The gravity feed fuel system as claimed in claim 6, wherein said primary boost pump and said secondary boost pump include seal drain lines commonly connected to said overboard drain line downstream of said drain valve assembly such that the electric fuel pump seal drains function only when a seal failure occurs permitting fuel leakage at the primary or secondary boost pump to escape through the overboard drain line.

* * * * *